United States Patent
Kim et al.

(10) Patent No.: US 8,913,828 B2
(45) Date of Patent: Dec. 16, 2014

(54) IMAGE ANALYSIS APPARATUS USING MAIN COLOR AND METHOD OF CONTROLLING THE SAME

(71) Applicants: Samsung Electronics Co., Ltd., Gyeonggi-do (KR); Seoul National University R&B Foundation, Seoul (KR)

(72) Inventors: Yun-Jung Kim, Seoul (KR); Sang-Hwa Lee, Seoul (KR); Nam-Ik Cho, Seoul (KR); Jae-Hyun An, Seoul (KR); Sung-Dae Cho, Gyeonggi-do (KR)

(73) Assignees: Samsung Electronics Co., Ltd. (KR); Seoul National University R&B Foundation (KR)

( * ) Notice: Subject to any disclaimer, the term of this patent is extended or adjusted under 35 U.S.C. 154(b) by 116 days.

(21) Appl. No.: 13/673,307

(22) Filed: Nov. 9, 2012

(65) Prior Publication Data
US 2013/0121575 A1 May 16, 2013

(30) Foreign Application Priority Data
Nov. 11, 2011 (KR) .................... 10-2011-0117840

(51) Int. Cl.
G06K 9/00 (2006.01)
G06F 17/30 (2006.01)
G06T 5/00 (2006.01)
G06T 7/40 (2006.01)

(52) U.S. Cl.
CPC .......... *G06T 5/001* (2013.01); *G06F 17/30277* (2013.01); *G06T 2207/20021* (2013.01); *G06F 17/3025* (2013.01); *G06T 7/408* (2013.01)
USPC ........................................................ 382/167

(58) Field of Classification Search
None
See application file for complete search history.

(56) References Cited

U.S. PATENT DOCUMENTS

| 7,120,873 | B2 * | 10/2006 | Li ................................. 715/723 |
| 7,760,935 | B2 * | 7/2010 | Kim ............................. 382/165 |
| 2005/0155055 | A1 * | 7/2005 | Li ................................. 725/32 |
| 2008/0147676 | A1 | 6/2008 | You |
| 2008/0193016 | A1 * | 8/2008 | Lim et al. ..................... 382/190 |
| 2010/0172584 | A1 * | 7/2010 | Lukac et al. .................. 382/167 |
| 2011/0150344 | A1 | 6/2011 | Lee |

FOREIGN PATENT DOCUMENTS

| KR | 100773441 | 11/2007 |
| KR | 1020110071208 | 6/2011 |

OTHER PUBLICATIONS

Wang et al., "Interactive Image Search by Color Map," Journal ACM Transactions on Intelligent Systems and Technology (TIST), vol. 3 Issue 1, Oct. 2011.*

(Continued)

*Primary Examiner* — Bhavesh Mehta
*Assistant Examiner* — Feng Niu
(74) *Attorney, Agent, or Firm* — The Farrell Law Firm, P.C.

(57) ABSTRACT

A method of controlling an image analysis apparatus is provided. The method includes receiving a query image; determining at least one main color distributed in the query image and a specific main color from among the at least one main color by using color information contained in the query image; dividing the query image into at least one block having a predetermined number of pixels; and determining whether each of the at least one block includes more than a predetermined percentage of a main color for comparison among the at least main color, and creating a binary spatial distribution map by digitizing the at least one block.

30 Claims, 13 Drawing Sheets

(56) References Cited

OTHER PUBLICATIONS

Shao et al., "Image retrieval based on MPEG-7 dominant color descriptor," Proc. of the 9th International Conference for Young Computer Scientists (ICYCS'08), Zhang Jia Jie, Hunan, China, Nov. 18-21, 2008, pp. 753-757.*

Deng et al., "An Efficient Color Representation for Image Retrieval," IEEE Transaction on Image Processing, 2001, vol. 10, pp. 140-147.*

Rui Min, H.D. Cheng, "Effective Image Retrieval Using Dominant Color Descriptor and Fuzzy Support Vector Machine," Pattern Recognition 42 (2009), pp. 147-157.*

Grzegorz Galinski et al., "Image Search using Dominant Colors", Fundamenta Informaticae 82, pp. 105-112, IOS Press, 2008.

Mandal, M. K. et al., Image Indexing Using Moments and Wavelets, IEEE Transactions on Consumer Electronics, vol. 42, No. 3, pp. 557-565, Aug. 1996.

Ohm, Jens-Rainer et al., The MPEG-7 Color Descriptors, pp. 28.

* cited by examiner

DC 4

DC 6

DC 8

IMAGE ANALYSIS APPARATUS USING MAIN COLOR AND METHOD OF CONTROLLING THE SAME

PRIORITY

This application claims priority under 35 U.S.C. §119(a) to a Korean Patent Application filed in the Korean Intellectual Property Office on Nov. 11, 2011, and assigned Serial No. 10-2011-0117840, the entire content of which is incorporated herein by reference.

BACKGROUND OF THE INVENTION

1. Field of the Invention

The present invention relates generally to an image analysis apparatus and method of controlling the same, and more particularly, to an image analysis apparatus for analyzing image using a main color and method of controlling the same.

2. Description of the Related Art

There has been a recent focus on the development of technologies for extracting similar images by comparing user-collected images and images stored in a database. In order to efficiently analyze the user-collected images, developers require a simpler algorithm and reduced amount of calculation.

Conventional image analysis methods include methods that use a histogram defined in Moving Picture Experts Group (MPEG) standards (i.e., obtaining the histogram of an image by dividing the image into a proper number of pieces and searching for the most similar image by comparing histograms between images). Conventional image analysis methods also include methods that analyze frequency characteristics of a signal with a Fourier transform.

Specifically, such conventional image analysis methods create a histogram represented in a sort of vector form, and then based on a distance between vectors of the created histogram, measure the extent of similarity between a query image and a database image. Also, such conventional image analysis methods determine the histogram frequency distribution, find relatively low frequencies, and measure the similarity of images by adding all the relatively low frequencies.

However, since such conventional image analysis methods simply use only histograms and statistical information of colors, such methods do not include spatial information (e.g., how colors in the statistical information are spatially distributed in the image). Thus, such conventional image analysis methods do not distinguish a background from objects having similar colors. Furthermore, since the conventional analysis methods cannot represent a spatial color distribution, such conventional image analysis methods have difficulty searching the database including an object similar to a particular object.

SUMMARY OF THE INVENTION

The present invention addresses at least the above-mentioned problems and/or disadvantages and to provide at least the advantages described below. Accordingly, an aspect of the present invention provides an image analysis apparatus for analyzing an image based on spatial color distribution by using main colors included in the image, and a method of controlling the same.

In accordance with an aspect of the present invention, a method of controlling an image analysis apparatus is provided. The method includes receiving a query image; determining at least one main color distributed in the query image and a specific main color from among the at least one main color by using color information contained in the query image; dividing the query image into at least one block having a predetermined number of pixels; and determining whether each of the at least one block divided form the query image includes more than a predetermined percentage of a main color for comparison from among the at least main color, and creating a binary spatial distribution map by digitizing the at least one block.

In accordance with another aspect of the present invention, a method of controlling an image analysis apparatus is provided. The method includes receiving a query image; determining at least one main color distributed in the query image and a specific main color from among the at least one main color by using color information contained in the query image; dividing the query image into at least one block having a predetermined number of pixels; determining whether each of the at least one block divided form the query image includes more than a predetermined percentage of a first main color among the at least one main color, and creating a binary spatial distribution map by digitizing the at least one block; receiving a database image for determining a similarity of the database image to the query image; dividing the database image into at least one block having a predetermined number of pixels; and determining whether each of the at least one block divided from the database image includes more than a predetermined percentage of a second main color among the at least one main color, and creating a binary spatial distribution map for comparison by digitizing the at least one block.

In accordance with another aspect of the present invention, an image analysis apparatus is provided. The apparatus includes an interface unit for receiving a query image; and a controller for determining at least one main color distributed in the query image and a specific main color from among the at least one main color by using color information contained in the query image, dividing the query image into at least one block having a predetermined number of pixels, determining whether each of the at least one block divided from the query image includes more than a predetermined percentage of a main color for comparison from among the at least one main color, and creating a binary spatial distribution map by digitizing the at least one block.

In accordance with another aspect of the present invention, an image analysis apparatus is provided. The apparatus includes an interface unit for receiving a query image; a storage for storing a database image for determining a similarity of the database image to the query image; and a controller for determining at least one main color distributed in the query image and a specific main color from among the at least one main color by using color information contained in the query image, dividing the query image into at least one block having a predetermined number of pixels, determining whether each of the at least one block divided from the query image includes more than a predetermined percentage of a first main color among the at least one main color; and creating a binary spatial distribution map by digitizing the at least one block, wherein the controller divides the database image into at least one block having a predetermined number of pixels, determines whether the at least one block divided form the database image includes more than a predetermined percentage of a second main color among the at least one main color, and creates a binary spatial distribution map for comparison by digitizing the at least one block.

BRIEF DESCRIPTION OF THE DRAWINGS

The above and other aspects, features and advantages of certain embodiments of the present invention will be more apparent from the following description taken in conjunction with the accompanying drawings, in which.

Figure 1:
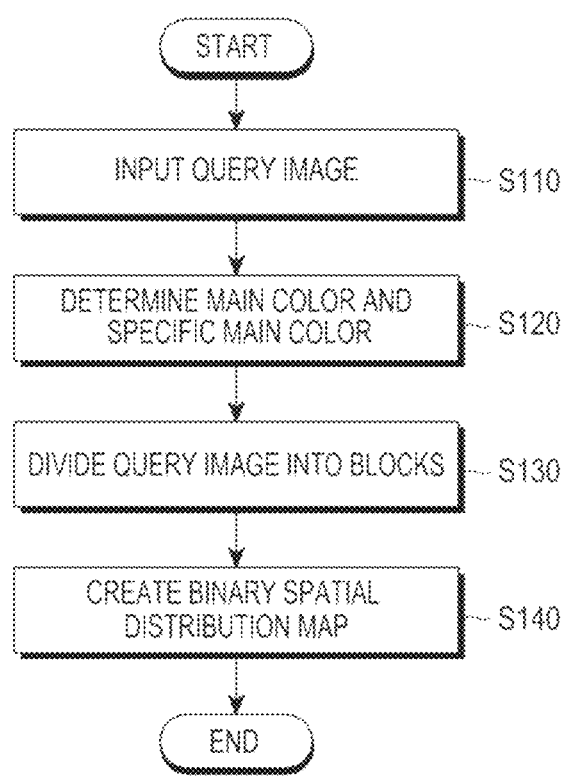
FIG. 1 is a flowchart illustrating a method of controlling an image analysis apparatus, according to an embodiment of the present invention.

DETAILED DESCRIPTION OF EMBODIMENTS
OF THE PRESENT INVENTION

Reference will now be made in detail to embodiments, examples of which are illustrated in the accompanying drawings, wherein like reference numerals refer to the like elements throughout. Detailed descriptions of well-known functionalities and configurations may be omitted to avoid obscuring the present invention FIG. 1 is a flowchart illustrating a method of controlling an image analysis apparatus, according to an embodiment of the present invention.

Referring to FIG. 1, an image analysis apparatus receives input of a query image, in step S110. The query image is an image a user desires to compare to other images, and the query image may include a particular object and a background. The image analysis apparatus may include an additional capture device (e.g., a camera module) for capturing a particular image according to the user's manipulation, in order to use the captured image as the query image. Alternatively, the image analysis apparatus may receive a stored image through an interface device and use the received stored image as the query image according to a user's designation.

The image analysis apparatus determines at least one main color by analyzing the input query image. The image analysis apparatus represents colors of pixels in the query image in a histogram, and determines a color having a frequency in the histogram greater than a predetermined threshold to be a main color. Herein, there may be more than one main color. A method for determining the main color in the image analysis apparatus is described in more detail herein below.

The image analysis apparatus determines the main colors of the input query image, and then determines a specific main color to be used to create a binary spatial distribution map. The specific main color is one of the main colors, and, for example, the image analysis apparatus may determine the specific main color by sequentially switching from among a plurality of main colors.

The image analysis apparatus divides the query image into blocks, in step S130. Specifically, the image analysis apparatus divides the query image into blocks, such that each block includes a predetermined number of pixels. For example, if the input query image has dimensions of 160×160 pixels and the predetermined number of pixels is 16×16=256 (i.e., 256 pixels arranged in 16×16 blocks), the image analysis apparatus divides the entire query image into 100 blocks of 16×16 pixels.

After dividing the query image into blocks, the image analysis apparatus creates a binary spatial distribution map in which each block is assigned a binary value. The image analysis apparatus digitizes each block based on the determined main color. If a percentage of the number of pixels having the specific main color in a block among the entire pixels in the block is at least equal to a predetermined percentage, the image analysis apparatus assigns a binary value '1' to the block. Otherwise, if a percentage of the number of pixels having the specific main color in a block among the entire pixels in the block is less than the predetermined percentage, the image analysis apparatus may assign a binary value '0' to the block.

For example, if a block includes 16×16 pixels and the predetermined percentage is 30%, the image analysis apparatus determines a color of each pixel contained in the block being digitized. Upon determining that the number of pixels having the specific main color in the block is 100, the image analysis apparatus assigns all of the pixels in the block the binary value '1'. Upon determining that the number of pixels having the specific main color in the block is 50, the image analysis apparatus assigns all of the pixels in the block the binary value '0'.

The image analysis apparatus performs such digitization on all blocks of the query image, and as a result, creates a binary spatial distribution map of the query image.

However, if there is a plurality of main colors, the image analysis apparatus further creates additional binary spatial distribution maps by switching the specific main colors. For example, there are G main colors, the image analysis apparatus creates G binary spatial distribution maps corresponding to the G main colors, respectively.

In FIG. 1, although steps S120 and S130 are shown to be sequentially performed, it will be appreciated that other sequences may be used in accordance with embodiments of the present invention.

As described above, the image analysis apparatus creates the binary spatial distribution map from the query image based on the main color, thus reflecting spatial distribution information of colors. Furthermore, the image analysis apparatus creates the binary spatial distribution map by dividing the query image into the predetermined sized blocks, thus minimizing the effect of noise as well as significantly reducing the amount of calculation.

Figure 2:
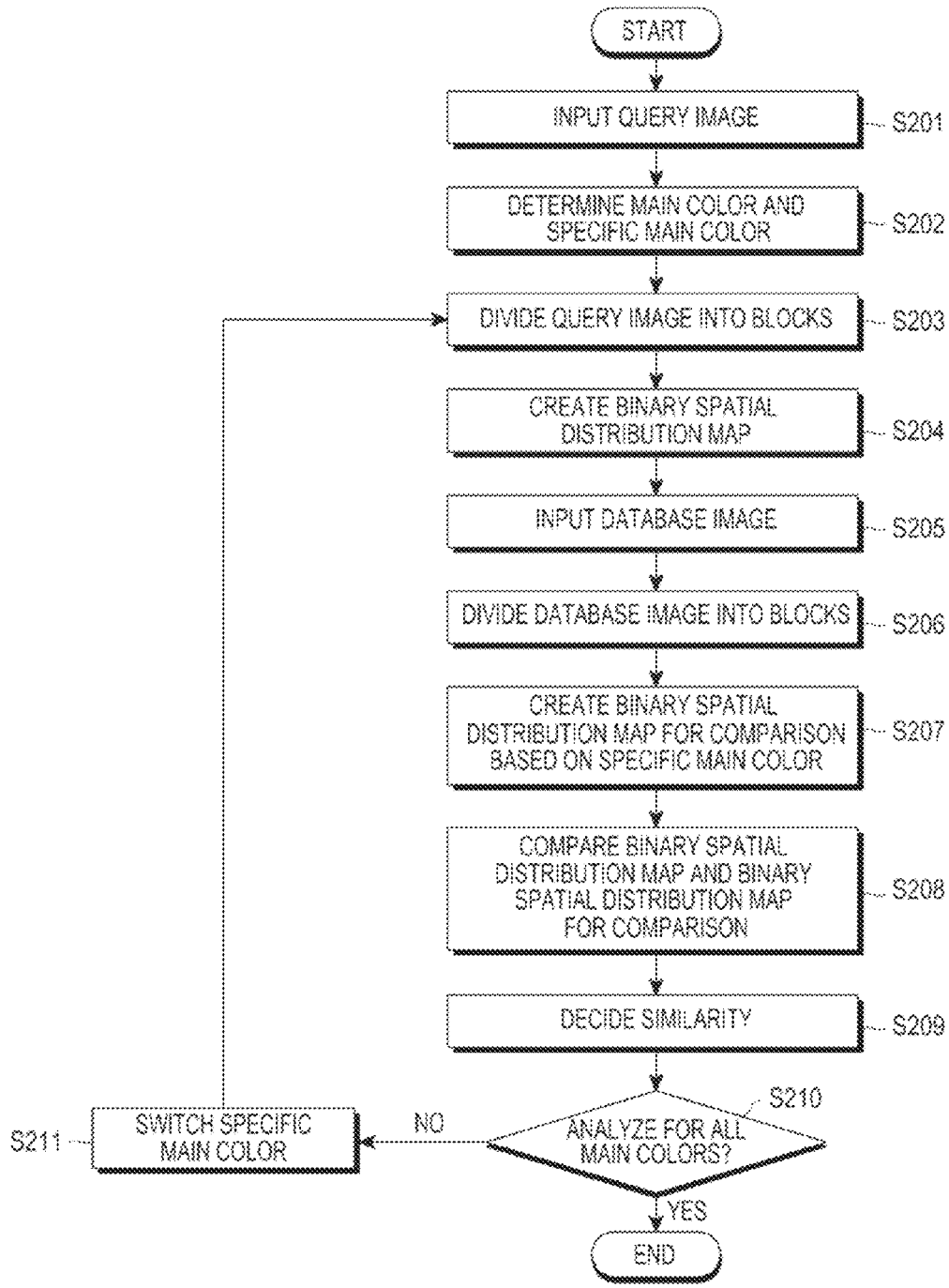
FIG. 2 is a flowchart illustrating a method of controlling an image analysis apparatus, according to another embodiment of the present invention.

FIG. 2 is a flowchart illustrating a method of controlling an image analysis apparatus, according to another embodiment of the present invention.

Steps of the flowchart of FIG. 2 are described with reference to FIGS. 3A to 3J, 4A to 4H, 5A to 5H, and FIG. 6.

Figure 3A:
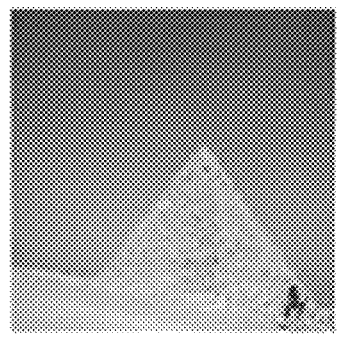
FIGS. 3A to 3J are diagrams illustrating a query image and its binary maps, according to various embodiments of the present invention.

Referring to FIG. 2, an image analysis apparatus receives a query image, in step S201. FIG. 3A illustrates the query image, according to an embodiment of the present invention. In the example according to FIG. 3A, the query image includes a yellow object in a pyramid shape and a sky blue background.

Figure 3B:
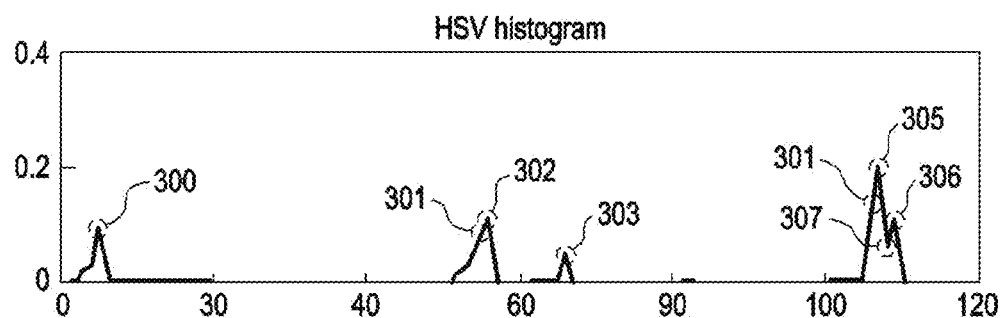

The image analysis apparatus determines a main color from the input query image, in step S202. The image analysis apparatus first designs a histogram for the query image in the Hue, Saturation, Value (HSV) space, as shown in FIG. 3B. The histogram is a graphical representation of the distribution of brightness of the query image, and is created in a manner that divides color coordinates into constant intervals and counting the number of pixels for each interval. The histogram is generated according to the following Equation (1).

$$h_{A,B,C}(a,b,c) = N \cdot Pr(A=a, B=b, C=c) \quad (1)$$

In Equation (1), A, B, and C refer to three color channels for a color space, and N refers to the number of all pixels in the image.

According to an embodiment of the present invention, the image analysis apparatus uses the HSV color space. The HSV color space includes hue, saturation, and value. The hue H refers to angular dimension, ranging from 0° to 360°, starting at the red primary having the longest wavelength at 0°. The saturation S refers to the extent of density of a specified color, having 100% at maximum density; and the V value refers to the extent of lightness, having 100% for white and 0% for black. Since 0% V means black, 0% V is represented in a single point. The darker an actual color is, the less the change in the hue is, and thus the width represented by the S is reduced in contrast to the high V. Considering the foregoing facts, that H information from an image may be valid only if S and V values are not very small. The image analysis apparatus determines a predetermined number of colors in the order of high frequencies of H and S values to be main colors.

FIG. 3B is a graph of the HSV histogram, according to an embodiment of the present invention. As shown in FIG. 3B, the HSV histogram shows colors and frequencies in x and y axis, respectively. In the present example according to an embodiment of the present invention, the image analysis apparatus determines the predetermined number of colors (i.e., 8 colors, 1st to 8th colors 300 to 307 having high frequencies) to be main colors. However, the above-described determination of the main colors based on the HSV color space is only provided as an example, and various other color spaces, such as, Red, Blue, Green (RGB), YUV, CIELab may also be used to determine the main colors in accordance with embodiments of the present invention.

Alternatively, the image analysis apparatus may determine one of the 8 main colors 300 to 307 to be a specific main color.

The image analysis apparatus divides the query image into blocks, in step S203. Specifically, the image analysis apparatus divides the query image into blocks, such that each block includes the predetermined number of pixels. For example, if the input query image includes 160×160 pixels and the predetermined number of pixels is 256 arranged in 16×16 blocks, the image analysis apparatus divides the entire query image into 100 blocks.

Figure 3C:
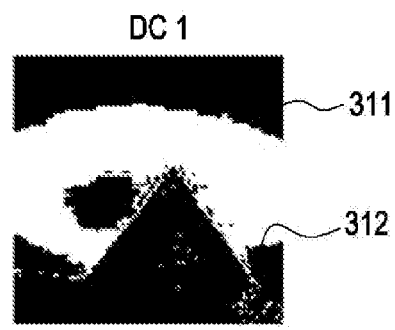

The image analysis apparatus creates the binary spatial distribution map from the query image divided into blocks based on the specific main color, in step S204. In the present example, it is assumed that the image analysis apparatus determines the first color to be the specific main color. The image analysis apparatus creates a binary map in which a binary value 1 or 0 is assigned to each pixel in the query image by first determining whether the each pixel comes in the specific main color (i.e., the first color). In other words, in the binary map in the present example according to an embodiment of the present invention, a pixel that matches the specific main color has the value 1, and a pixel that does not match a specific main color has the value 0. FIG. 3C shows a binary map, according to an embodiment of the present invention. In the example according to FIG. 3C, the binary map includes two main edges 311 and 312.

After creation of the binary map, the image analysis apparatus creates the binary spatial distribution map based on whether each block includes more than a predetermined percentage of the specific main color. For example, if a block includes 256 pixels arranged in 16×16 blocks and the predetermined percentage is 30%, the image analysis apparatus determines a color of each pixel contained in the block being digitized. Upon determining that the number of pixels having the specific main color in the block is 100, the image analysis apparatus assigns all the pixels in the block the binary value '1'. Upon determining that the number of pixels having the specific main color in the block is 50, the image analysis apparatus assigns all the pixels in the block the binary value '0'.

Equation (2) is used to create the binary spatial distribution map, according to an embodiment of the present invention.

$$M_i^Q(p) = \begin{cases} 1, & \text{if } \frac{N(A)}{N(B)} > \gamma \\ 0, & \text{otherwise} \end{cases} \quad (2)$$

In Equation (2), p refers to a pth block, N(A) refers to the number of pixels that come in a main color i in the pth block, and N(B) refers to the number of all pixels in the pth block. r refers to the predetermined percentage.

Figure 4A:
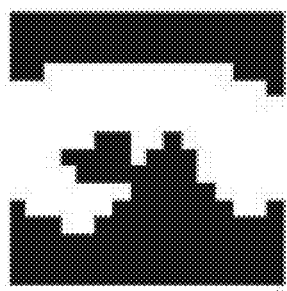
FIGS. 4A to 4H are diagrams illustrating binary spatial distribution maps, according to various embodiments of the present invention.

FIG. 4A is a diagram illustrating a binary spatial distribution map corresponding to the binary map of FIG. 3C. In FIG. 4A, the binary spatial distribution map is divided into blocks, thus minimizing the effect of noise as well as reducing the amount of calculation.

Figure 5A:
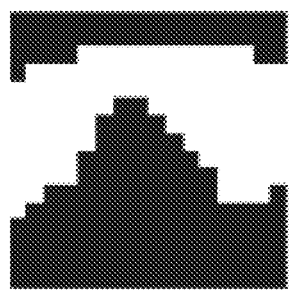
FIGS. 5A to 5H are diagrams illustrating a database image and its binary spatial distribution maps for comparison, according to various embodiments of the present invention.

After creating the binary spatial distribution map, the image analysis apparatus receives a database image, in step S205. The database image may be stored in the image analysis apparatus in advance, or may be downloaded from a web through a communication module additionally contained in the image analysis apparatus. The database image may provide a similar image to the query image, or an image including a similar object. That is, the database image is an image to be compared to the query image, in order to determine their similarity. FIG. 5A is a diagram illustrating a database image, according to an embodiment of the present invention. The database image of FIG. 5A includes an object in a pyramid shape a bit different from that of FIG. 3A, and also includes a sky blue background.

When the database image is entered, the image analysis apparatus divides the database image into blocks, in step S206. The database image is divided into the same number of blocks as that of the query image. For example, assume that the query image includes 160×160 pixels and the database image includes 320×320 pixels. As described above, if the image analysis apparatus divides the query image into 100 blocks, the image processing apparatus also processes the database image to have 100 blocks, each block having 32×32 pixels.

Figure 5B:
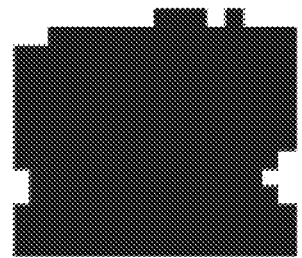

The image analysis apparatus creates the binary spatial distribution map for comparison from the database image divided into blocks, in step S208. In this regard, the image analysis apparatus creates the binary spatial distribution map for comparison in a manner that assigns the binary value 0 or 1 to each block of the database image based on the determined specific main color. Specifically, the image analysis apparatus first creates the binary map for comparison having a value 1 or 0 assigned to each pixel based on whether each pixel of the database image comes in the specific main color. Then, the image analysis apparatus creates the binary spatial distribution map for comparison having the value 1 or 0 assigned to each block by determining whether more than a predetermined percentage of pixels come in the specific main color in each block. The image analysis apparatus uses Equation (2) to create the binary spatial distribution map for comparison. FIG. 5B is a diagram illustrating a binary spatial distribution map for comparison, according to an embodiment of the present invention.

The image analysis apparatus determines similarity between the query image and the database image by comparing the binary spatial distribution map of the query image and the binary spatial distribution map for comparison of the database image, in step S209. The image analysis apparatus determines the similarity based on whether binary values of each block of the binary spatial distribution map of the query image and a corresponding block of the binary spatial distribution map for comparison of the database image are identical. For example, if 1st and 3rd blocks of the query image have the binary value 1 and the corresponding 1st and 3rd blocks of the database image also have the binary value 1, the image analysis apparatus determines that the 1st and 3rd blocks of both images are consistent. If 2nd and 3rd blocks of the query image have the binary value 0 and the corresponding 2nd and 3rd blocks of the database image have the binary value 1, the image analysis apparatus determines that the 2nd and 3rd blocks of both images are not inconsistent. The image analysis apparatus determines consistency/inconsistency of all blocks between the query image and the database image, and based on the summation of the consistency/inconsistency results of all blocks, determines the similarity between the query image and the database image. The similarity decision may be performed according to the following Equations (3) and (4).

$$S_{Q,DB} = \sum_{i=D} Hit_i(p) \quad (3)$$

$$Hit_i(p) = \begin{cases} 1, & \text{if } M_i^Q = 1 \text{ and } M_i^{DB} = 1 \\ 0, & \text{otherwise} \end{cases} \quad (4)$$

In Equation (3), $S_{Q,DE}$ refers to the similarity, determined by the summation of Hit function. i refers to an ith main color, and p refers to a pth block. D refers to all the main colors.

Equation (4) represents the Hit function of Equation (3), with an AND operation having the value 1 only if both $M_i^Q$ and $M_i^{DB}$ have the value 1, or, otherwise, 0. $M_i^Q$ is a binary value of a block of the query image, and $M_i^{DB}$ is a binary value of a block of the database image. According to Equations (3) and (4), a higher frequency of consistency between binary values of blocks of the query image and the database image corresponds to an increased similarity. If the similarity is greater than a predetermined value, the image analysis apparatus determines that the query image and the database image are similar.

Figure 6:
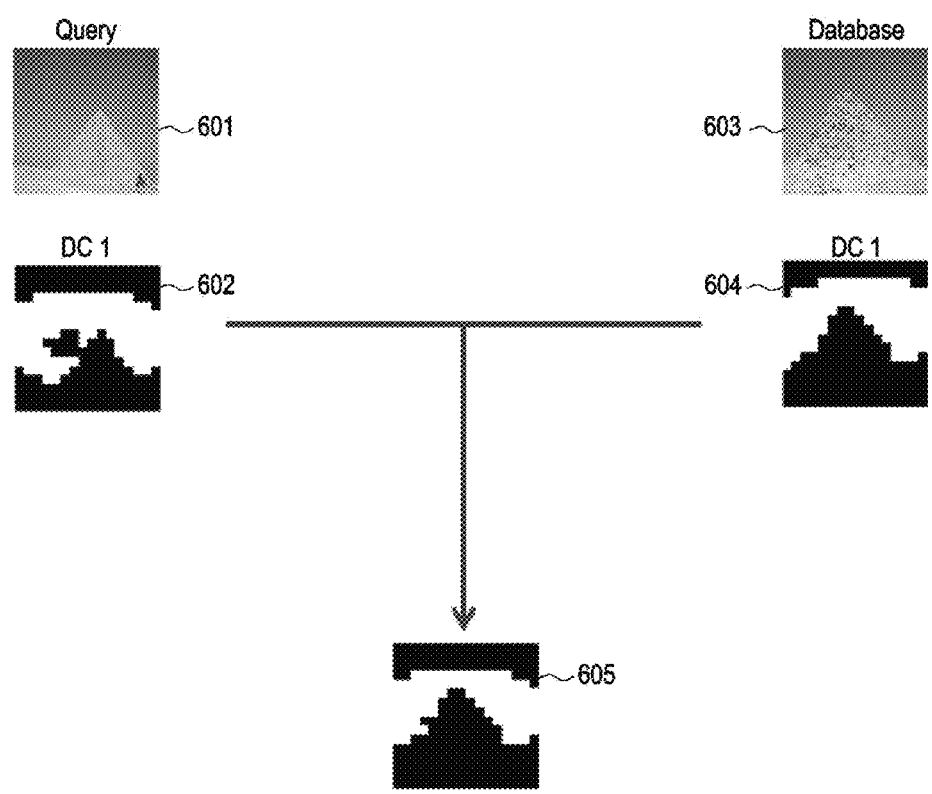
FIG. 6 is a diagram illustrating a process for deciding similarity, according to an embodiment of the present invention.

FIG. 6 is a diagram illustrating a process for deciding similarity, according to an embodiment of the present invention.

Referring to FIG. 6, an image analysis apparatus compares a binary spatial distribution map 602 created from a query image 601 with a binary spatial distribution map for comparison 604 created from a database image 603. The result of the comparison is a result of the above-described AND operation performed with respect to the binary spatial distribution map 602 and the binary spatial distribution map for comparison 604.

The image analysis apparatus performs the foregoing processes on all the main colors, in step S210. More specifically, the image analysis apparatus repeats the foregoing processes by switching the specific main color from first color to second color, in step S211. Upon completing the similarity decision for the second color, the image analysis apparatus repeats the foregoing procedures by switching the specific main color from the second color to a third color. Such procedures are repeated until analysis of all the main colors is completed.

Figure 3D:
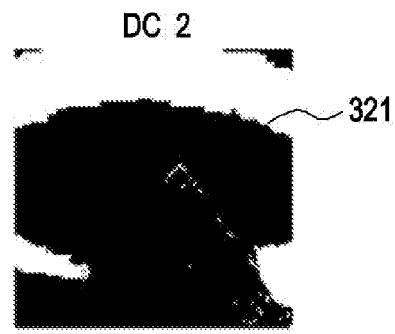
Figure 3E:
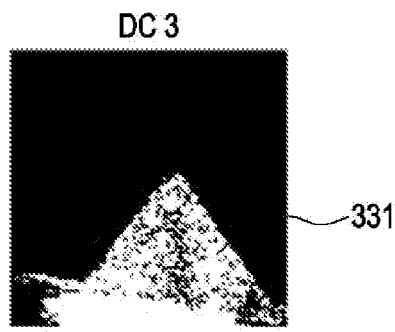
Figure 3F:
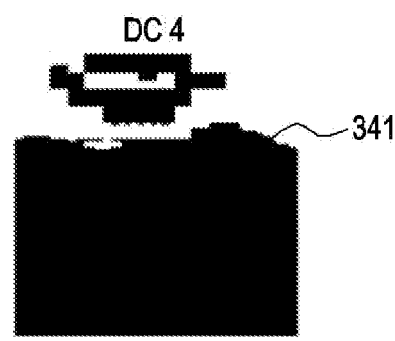
Figure 3G:
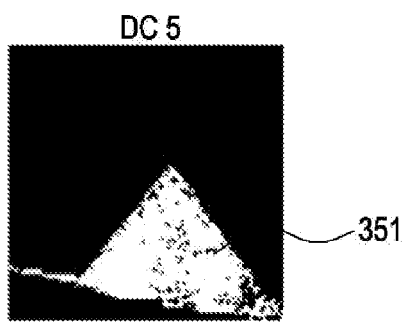
Figure 3H:
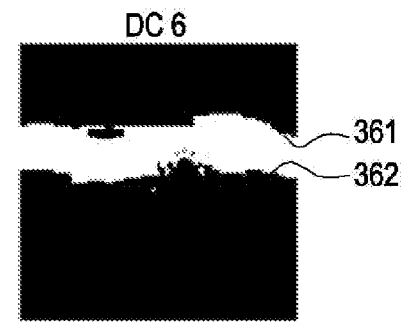
Figure 3I:
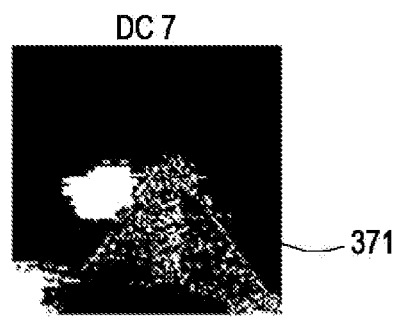
Figure 3J:
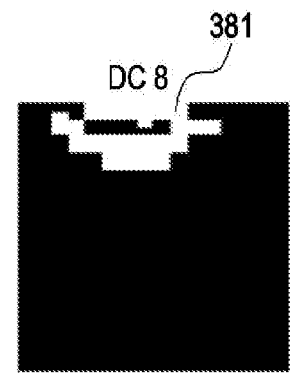
Figure 4B:
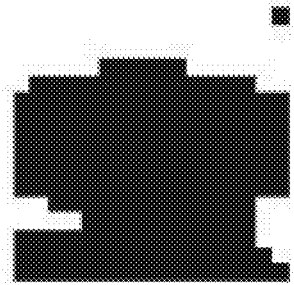
Figure 4C:
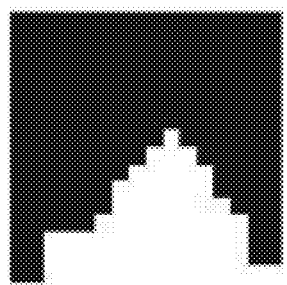
Figure 4D:
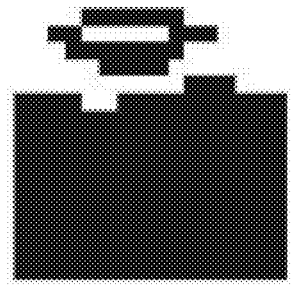
Figure 4E:
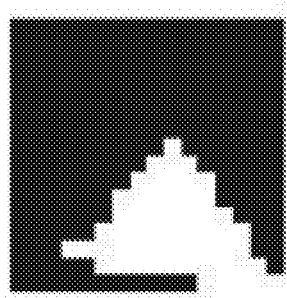
Figure 4F:
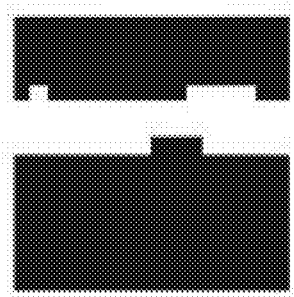
Figure 4G:
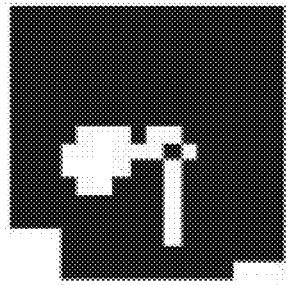
Figure 4H:
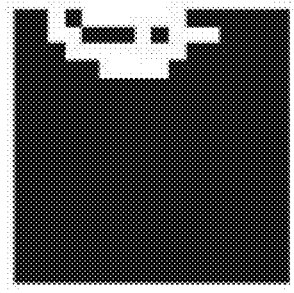
Figure 5C:
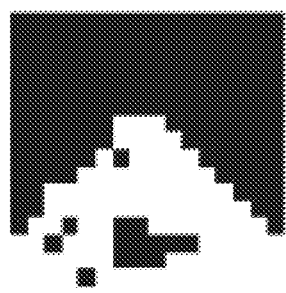
Figure 5D:
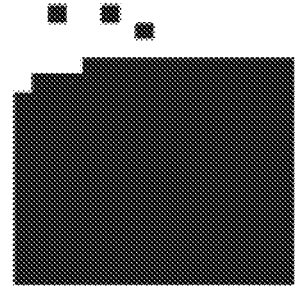
Figure 5E:
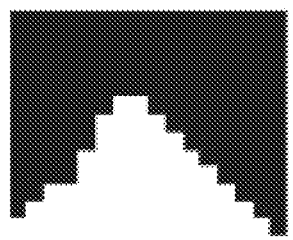
Figure 5F:
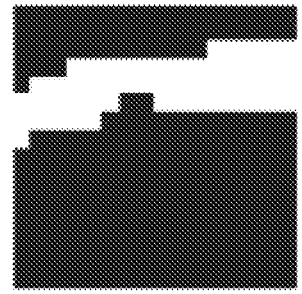
Figure 5G:
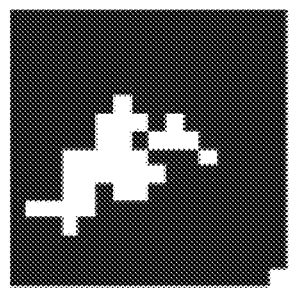
Figure 5H:
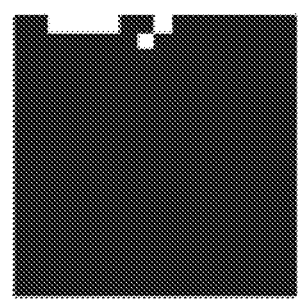

FIG. 3D is a diagram illustrating a binary map generated after switching the specific main color from the first color to the second color according to an embodiment of the present invention. The binary map of FIG. 3D includes a different edge 321 than the binary map of FIG. 3C, which is caused by the change of the specific main color. FIG. 4B is a diagram illustrating a binary spatial distribution map corresponding to FIG. 3D, which has a different figure than that of FIG. 4A, according to an embodiment of the present invention. FIG. 5C is a diagram illustrating a binary spatial distribution map for a comparison created from the database image after determining the second color to be the specific main color, according to an embodiment of the present invention. The image analysis apparatus determines similarity by comparing the binary spatial distribution map of FIG. 4B and the binary spatial distribution map for comparison of FIG. 5C.

By contrast, FIGS. 3E to 3J are diagrams illustrating binary maps corresponding to third to eighth colors, respectively, and FIGS. 4C to 4H are diagrams illustrating binary spatial distribution maps corresponding to third to eighth colors, respectively, according to an embodiment of the present invention. FIGS. 5C to 5H are diagrams illustrating binary spatial distribution maps for comparison corresponding to third to eighth colors, respectively, according to an embodiment of the present invention. The image analysis apparatus determines similarity by comparing binary spatial distribution maps of FIGS. 4C to 4H with binary spatial distribution maps for comparison of FIGS. 5C to 5H, respectively.

Figure 7:
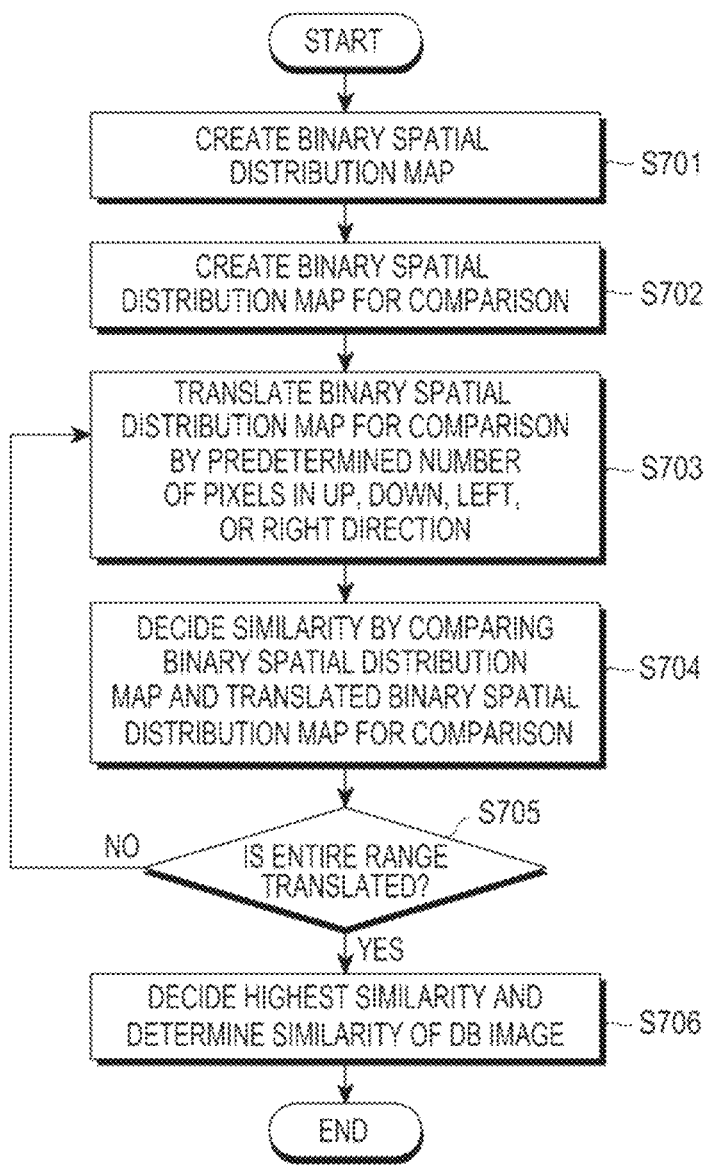
FIG. 7 is a flowchart illustrating a method of controlling an image analysis apparatus, according to another embodiment of the present invention.

FIG. 7 is a flowchart illustrating a method of controlling the image analysis apparatus, according to another embodiment of the present invention.

Referring to FIG. 7, an image analysis apparatus creates a binary spatial distribution map from a query image, in step S701, and creates a binary spatial distribution map for comparison from the database image, in step S702. Procedures of creating the binary spatial distribution map and the binary spatial distribution map for comparison are described in detail herein above, and accordingly, a further description about these procedures is omitted for clarity and conciseness.

The image analysis apparatus translates the binary spatial distribution map by a predetermined number of pixels in the up, down, left, or right direction, in step S703. When an object contained in the query image is contained at a different location in the database image, the image analysis apparatus compares the query image and the database image by translating the binary spatial distribution map for comparison by the predetermined number of pixels.

Figure 8:
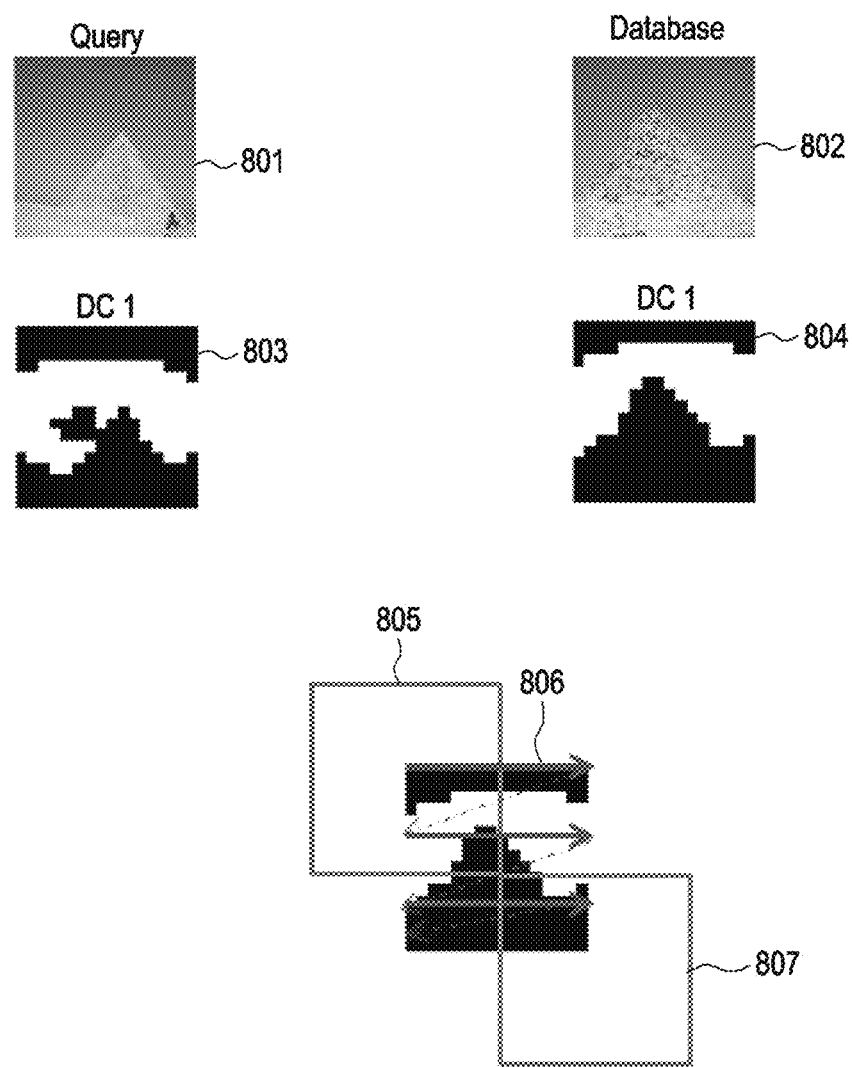
FIG. 8 is a diagram illustrating a process performed by image analysis apparatus for comparing a query image with a database image by translating a binary spatial distribution map for comparison by a predetermined number of pixels, according to an embodiment of the present invention.

FIG. 8 is a conceptual diagram illustrating a process performed by an image analysis apparatus for comparing a query image with a database image by translating a binary spatial distribution map for comparison by a predetermined number of pixels, according to an embodiment of the present invention.

Referring to FIG. 8, the image analysis apparatus creates a binary spatial distribution map 803 from a query image 801, and creates a binary spatial distribution map for comparison 804 from the database image 802. The query image 801 and the database image 802 each contain an object in a pyramid shape, but at different respective locations.

The image analysis apparatus translates the binary spatial distribution map for comparison 806 in the left or right direction, and then measures the similarity by comparing the translated binary spatial distribution map for comparison with the query image 805 and 807.

To measure the similarity by translating the binary spatial distribution map for comparison, the image analysis apparatus uses the following Equation (5).

$$S_d^T = \underset{t}{\mathrm{argmax}} \sum_p H_t\big(M_d^Q(p), M_d^{DB}(p+t)\big) \quad (5)$$

In Equation (5), $S^T_d$ refers to similarity, d refers to a specific main color, and T refers to information about the translation by which to have the highest similarity. t refers to information about a translated distance, $M^Q_d(p)$ is a binary value of the pth block of the binary spatial distribution map for a specific main color d, and $M^{DB}_d(p+t)$ is a binary value of the pth block of the binary spatial distribution map for comparison for a specific main color d, that has been translated by t.

A procedure for deciding the similarity is performed by translating the entire range of the database image, in step S705.

The similarity $S^T_d$ may be determined through the Hit function (e.g., the above-described AND operation), or may be determined by a summation of consistency/inconsistency results of the binary spatial distribution map of the query image and the translated binary spatial distribution map for comparison of the database image. A value of t, by which the greatest summation may be designated T, and arg max before the sigma operator determines a translation distance by which to have the highest similarity, in step S706. The image analysis apparatus may determine the similarity between the query image and the database image based on whether the highest similarity is greater than a predetermined threshold.

As described above, the image analysis apparatus is able to determine whether the query image and the database image are similar to each other even if an object for comparison is contained in each of the query image and the database image at a different location.

Figure 9:
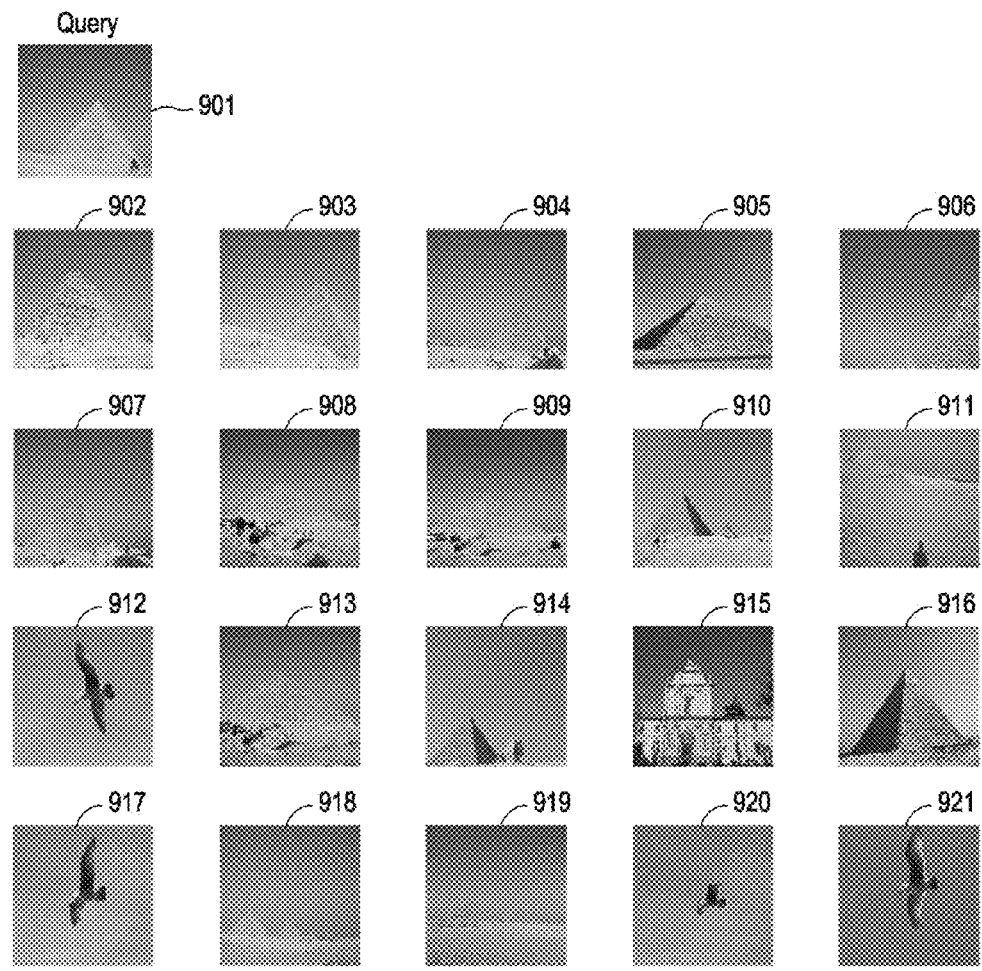
FIG. 9 is a diagram illustrating a plurality of database images arranged from highest to lowest in similarity to a query image without considering translation, according to an embodiment of the present invention.

FIG. 9 is a diagram illustrating a plurality of database images arranged from highest to lowest in similarity to a query image without taking considering translation, according to an embodiment of the present invention.

Figure 10:
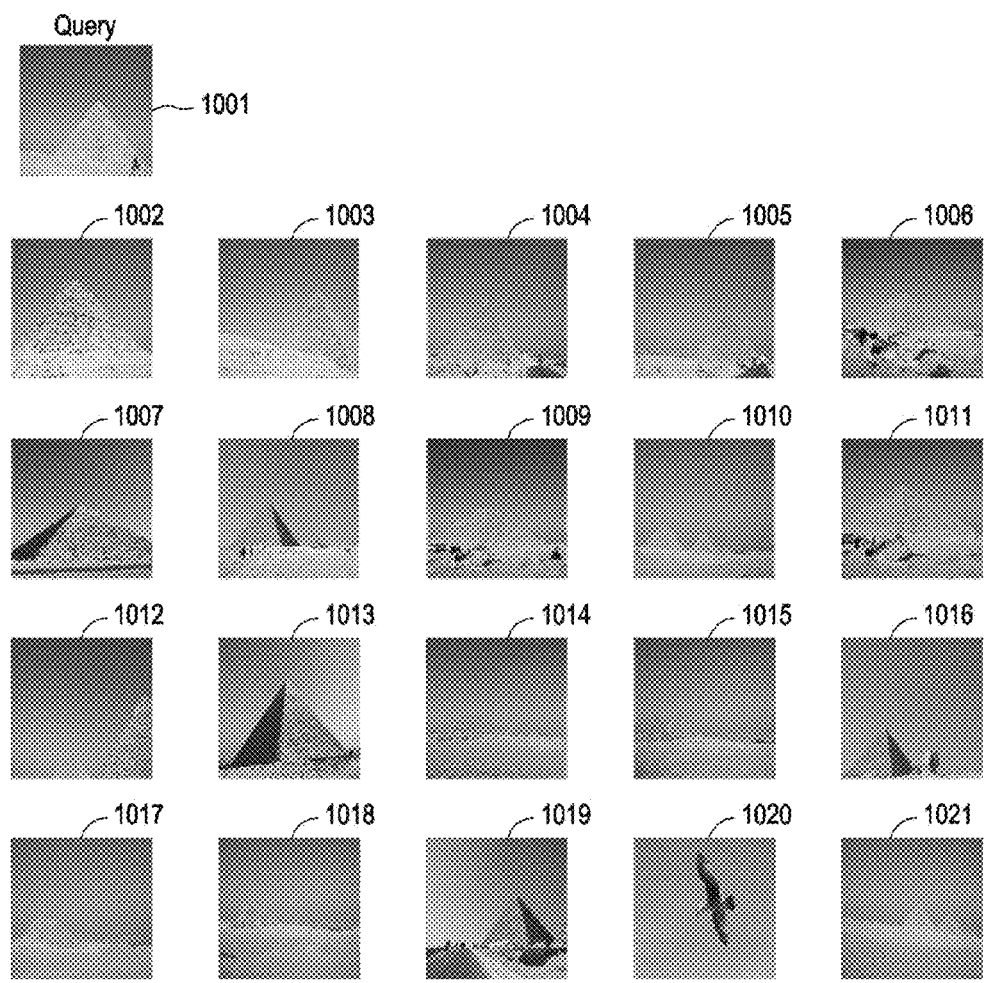
FIG. 10 is a diagram illustrating a plurality of database images arranged from highest to lowest in similarity to a query image in consideration of translation, according to an embodiment of the present invention.

FIG. 10 is a diagram illustrating a plurality of database images arranged from highest to lowest in similarity to a query image when considering translation, according to an embodiment of the present invention.

Figure 11:
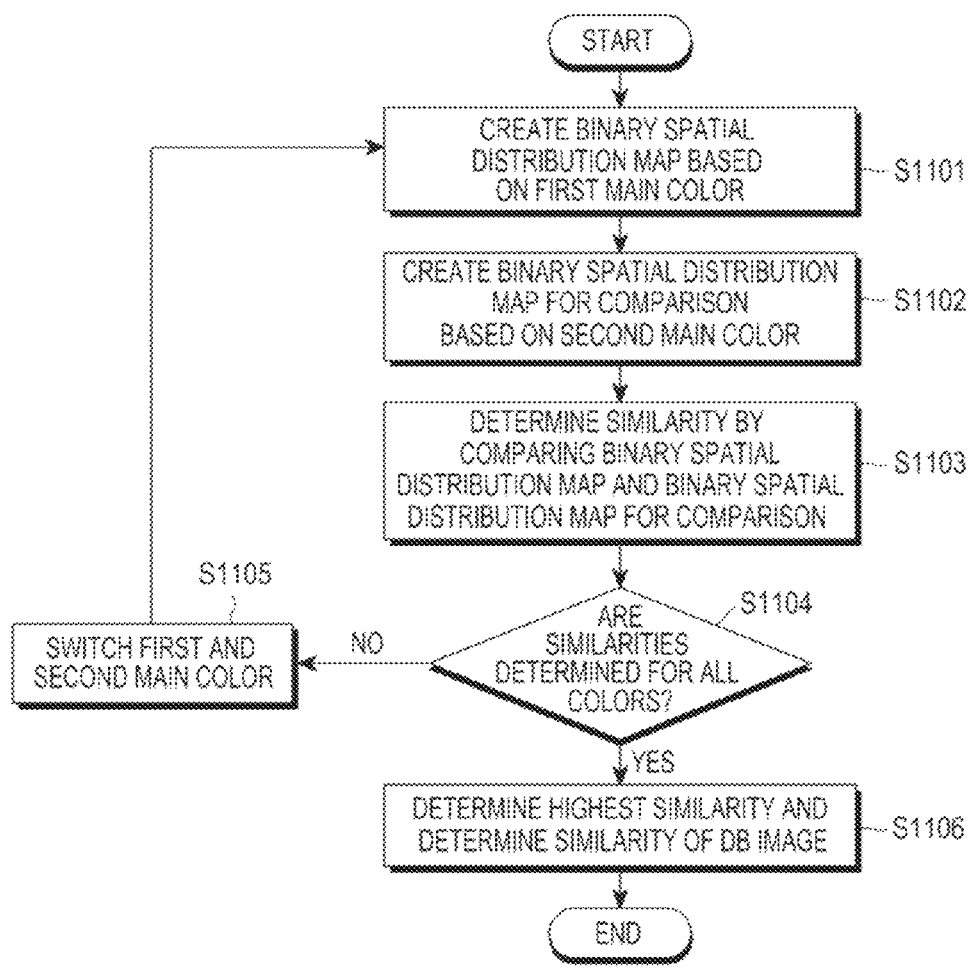
FIG. 11 is a flowchart illustrating a method of controlling an image analysis apparatus, according to another embodiment of the present invention.

FIG. 11 is a flowchart illustrating a method of controlling the image analysis apparatus, according to another embodiment of the present invention.

Referring to FIG. 11, an image analysis apparatus creates a binary spatial distribution map from a query image, in step S1101, and creates a binary spatial distribution map for comparison from a database image, in step S1102. In contrast to the embodiment described with reference to FIG. 7, in the present example according to FIG. 11, the image analysis apparatus creates the binary spatial distribution map based on the first main color and creates the binary spatial distribution map for comparison based on the second main color. In other words, the image analysis apparatus creates the binary spatial distribution map and the binary spatial distribution map for comparison by applying different main colors to the query image and the database image, respectively.

The image analysis apparatus determines the similarity by comparing the binary spatial distribution map and the binary spatial distribution map for comparison. The image analysis apparatus determines the similarity between both the maps by using Equations (3) and (4).

The image analysis apparatus performs the foregoing processes on all the main colors, in step S1104. More specifically, after applying the first main color to the query image and the second main color to the database image, the image analysis apparatus repeats the foregoing procedures by switching the main colors such that the second main color is applied to the query image and the third main color is applied to the database image, in step S1105.

The image analysis apparatus determines the highest similarity from among the determined similarities by repeating the foregoing procedures, and based on whether the highest similarity is greater than a predetermined threshold, the image analysis apparatus determines the similarity between the query image and the database image, in step S1106.

In the meantime, the image analysis apparatus creates the translated binary spatial distribution map for comparison by translating the binary spatial distribution map for comparison created based on the second main color by a predetermined number of pixels in the up, down, left, or right direction. The image analysis apparatus also determines the similarity between the query image and the database image by comparing the binary spatial distribution map and the translated binary spatial distribution map for comparison. In the foregoing procedure, the creation of the translated binary spatial distribution map for comparison is repeated for the entire range of the database image, and thus the similarity between the query image and the database image is determined by determining the highest similarity from among a plurality of similarities obtained by the repeated operations. A similar operation that considers the different main colors as well as the translation is performed according to Equation (6).

$$S_d^T = \underset{t}{\mathrm{argmax}} \sum_{di,dj} \sum_p H_t\big(M_{di}^Q(p), M_{dj}^{DB}(p+t)\big)w(d_i, d_j) \quad (6)$$

In Equation (6), $S^T_d$ refers to the similarity, d refers to a main color, and T refers to information about the translation by which to maximize $S^T_d$. t refers to information about a translation distance, $M^Q_i(p)$ is a binary value of the pth block of the binary spatial distribution map for a specific main color i, and $M^{DB}_j(p+t)$ is a binary value of the pth block of the binary spatial distribution map for comparison for a specific main color j that has been translated by t. $w(d_i,d_j)$ refers to a weight based on the specific main colors i and j. Examples of the weight w are represented in Equation (7).

$$\frac{1}{|d_i - d_j| + 1}, \frac{1}{|d_i - d_j|^2 + 1}, \exp\{-|d_i - d_j|^2\}. \qquad (7)$$

As described above, the greater the distance between the specific main colors i and j in the color space, the lower the weight.

As described above, in addition to the translation of the database image, an image analysis method according to an embodiment of the present invention may also consider an implementation where different specific main colors are applied to the query image and the database image. With such a method, one may determine that the images are obtained by capturing the same object in similar colors are similar images.

Figure 12:
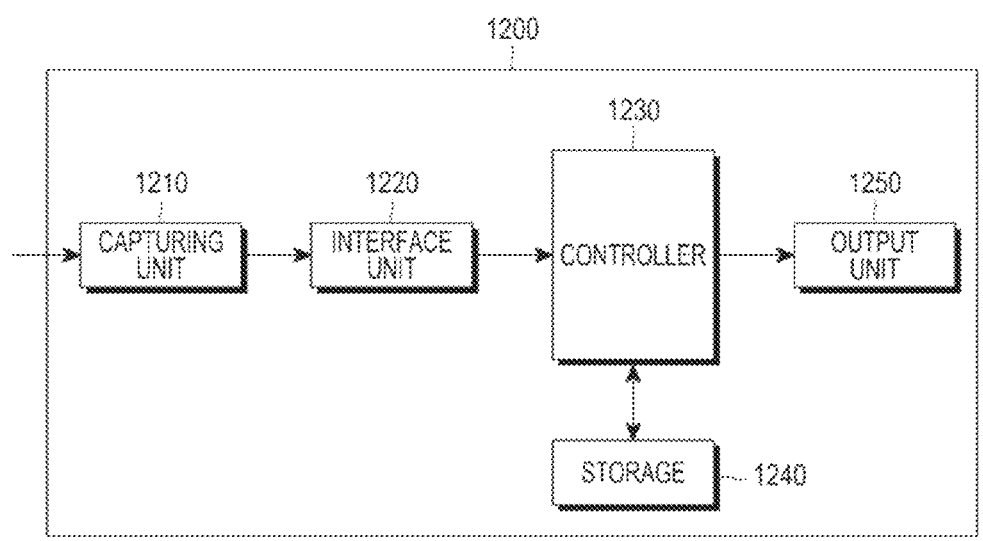
FIG. 12 is a block diagram illustrating an image analysis apparatus, according to another aspect of the present invention.

FIG. 12 is a block diagram illustrating an image analysis apparatus, according to another aspect of the present invention.

Referring to FIG. 12, an image analysis apparatus 1200 includes a capturing unit 1210, an interface unit 1220, a controller 1230, a storage 1240, and an output unit 1250.

The capturing unit 1210 captures a query image and provides the query image in a format of a predetermined image file. The capturing unit 120 may include, but is not limited to, a Complementary Metal Oxide Semiconductor (CMOS), a Charge Coupled Device (CCD), and/or any other device capable of capturing images.

The interface unit 1220 receives the query image and forwards the query image to the controller 1230. As an alternative, interface unit 1220 may receive the input query image, not from the capturing unit 1210, but instead from an external storage media in which case the interface unit 1220 may serve as a USB port.

The controller 1230 determines at least one main color distributed in the query image and a specific main color from among the at least one main color by using color information contained in the query image, divides the query image into at least one block having a predetermined number of pixels, determines whether the at least one block includes more than a predetermined percentage of a main color for comparison among the main colors, and creates a binary spatial distribution map by digitizing the at least one block. The controller 1230 may include microprocessors, mini computers, integrated circuits, etc., but is not limited thereto.

The storage 1240 stores the database images. The storage 1240 may be a Non-Volatile Memory (NVM), such as a Solid State Disk (SSD), a flash memory card, a Read Only Memory (ROM), etc., or may be a volatile memory, such as a Random Access Memory (RAM).

As an alternative, the database images may be received, not from the storage 1240, but from an external source via a communication unit (not shown) via a wired or wireless connection.

The output unit 1250 outputs database images determined by the controller 1230 to be similar to the query image. The output unit 1250 may output the database images visually, and in this case, may be implemented as a display module or a touch screen. The output unit 1250 may also be another output device, such as a USB port, for example.

The controller 1230 divides the database image into at least one block having a predetermined number of pixels, determines whether the at least one block includes more than a predetermined percentage of the specific main color; and creates a binary spatial distribution map for comparison by digitizing the at least one block.

The controller 1230 may also determine the similarity of the database image to the query image by comparing the binary spatial distribution map and binary spatial distribution map for comparison.

Herein, the similarity may be determined according to the foregoing Equations (3) and (4).

The controller 1230 determines the database image is similar to the query image if the similarity is greater than a predetermined value.

In the meantime, the controller 1230 creates the translated binary spatial distribution map for comparison by translating the binary spatial distribution map for comparison by a predetermined number of pixels in the up, down, left, or right direction.

The controller 1230 may also determine the similarity of the database image to the query image by comparing the binary spatial distribution map and the translated binary spatial distribution map for comparison.

The controller 1230 repeats a step of creating the translated binary spatial distribution map for comparison for the entire range of the database image, and thus determines the similarity between the query image and the database image by determining the highest similarity among a plurality of similarities obtained from the repetition. The controller determines the highest similarity according to the foregoing equation 5.

According to another embodiment of the present invention, the image analysis apparatus further includes an interface unit 1220 for receiving the query image, a storage 1240 for storing the database image for a decision of similarity to the query image, and a controller 1230 for determining at least one main color distributed in the query image and a specific main color among the at least one main color by using color information contained in the query image, dividing the query image into at least one block having a predetermined number of pixels, determining whether the at least one block includes more than a predetermined percentage of a first main color among the main colors, and creating a binary spatial distribution map by digitizing the at least one block.

The controller 1230 divides the database image into at least one block having a predetermined number of pixels, determines whether the at least one block includes more than a predetermined percentage of a second main color among the main colors, and creates a binary spatial distribution map for comparison by digitizing the at least one block.

The controller 1230 may also determine the similarity of the database image to the query image by comparing the binary spatial distribution map and binary spatial distribution map for comparison.

The controller 1230 may determine the similarity between the query image and the database image by repeatedly switching the first and second main colors to other main colors for all the at least one main color, and then determining a highest similarity among a plurality of similarities obtained from the repetition.

The controller 1230 may determine the similarity of the database image to the query image by creating a translated binary spatial distribution map for comparison by translating the binary spatial distribution map for comparison by a predetermined number of pixels in the up, down, left, or right direction, comparing the binary spatial distribution map with the translated binary spatial distribution map for comparison.

The controller 1230 may repeat a step of creating the translated binary spatial distribution map for comparison for the entire range of the database image, and thus determine the similarity between the query image and the database image by determining the highest similarity among a plurality of similarities obtained from the repetition.

The controller 1230 herein may determine the similarity between the query image and the database image based on Equation (7).

According to various embodiments of the present invention, an image analysis apparatus for analyzing an image based on the spatial color distribution by using main colors included in the image, and a method of controlling the same are provided. The image analysis apparatus and method of controlling the same according to the embodiments of the present invention facilitate extraction of an image including an object similar to a particular object by using the spatial color distribution. In addition, even when a background color and a color of the particular object are similar, the embodiments of the present invention facilitate image analysis, since the embodiments efficiently distinguish the particular object from the background color.

Although several embodiments of the present invention have been illustrated and described herein, it will be understood that various modifications can be made without departing the scope of the present invention. Thus, it will be apparent to those ordinary skilled in the art that the present invention is not limited to the embodiments described, is defined according to the appended claims and their equivalents.

What is claimed is:

1. A method of controlling an image analysis apparatus, the method comprising:
    receiving a query image;
    determining at least one main color distributed in the query image and a specific main color from among the at least one main color by using color information contained in the query image;
    dividing the query image into at least one block having a predetermined number of pixels; and
    determining whether each of the at least one block divided from the query image includes more than a predetermined percentage of a main color for comparison from among the at least main color, and creating a binary spatial distribution map by digitizing the at least one block.

2. The method of claim 1, further comprising:
    receiving a database image for determining a similarity of the database image to the query image;
    dividing the database image into at least one block having a predetermined number of pixels; and
    determining whether each the at least one block divided from the database image includes more than a predetermined percentage of the specific main color, and creating a binary spatial distribution map for comparison by digitizing the at least one block.

3. The method of claim 2, further comprising determining the similarity of the database image to the query image by comparing the binary spatial distribution map and the binary spatial distribution map for comparison.

4. The method of claim 3, wherein the similarity is determined according to:

$$S_{Q,DB} = \sum_{i=D} Hit_i(p)$$

$$Hit_i(p) = \begin{cases} 1, & \text{if } M_i^Q = 1 \text{ and } M_i^{DB} = 1 \\ 0, & \text{otherwise,} \end{cases}$$

where $S_{Q,DE}$ is to the similarity, i is to an ith main color, p is to a pth block, D corresponds to all of the main colors, $M_i^Q$ is a binary value of a block of the query image, and $M_i^{DB}$ is a binary value of a block of the database image.

5. The method of claim 3, further comprising determining, if the similarity is greater than a predetermined value, that the database image is similar to the query image.

6. The method of claim 2, further comprising creating a translated binary spatial distribution map for comparison by translating the binary spatial distribution map for comparison by a predetermined number of pixels in a up, down, left, or right direction.

7. The method of claim 6, further comprising determining the similarity of the database image to the query image by comparing the binary spatial distribution map and the translated binary spatial distribution map for comparison.

8. The method of claim 7, further comprising:
    repeating the creation of the translated binary spatial distribution map for comparison for an entire range of the database image, and
    determining the similarity of the database image to the query image by determining a highest similarity from among a plurality of similarities obtained from the repetition.

9. The method of claim 8, wherein the similarity is determined according to:

$$S_d^T = \operatorname*{argmax}_t \sum_p H_t(M_d^Q(p), M_d^{DB}(p+t)),$$

where $S^T_d$ is the similarity, d is the specific main color, and T refers to information about the translation by which to have the highest similarity, t is information about a translated distance, $M^Q_d(p)$ is a binary value of a pth block of the binary spatial distribution map for the specific main color d, and $M^{DB}_d(p+t)$ is a binary value of the pth block of the binary spatial distribution map for comparison for the specific main color d, which has been translated by t.

10. A method of controlling an image analysis apparatus, the method comprising:
    receiving a query image;
    determining at least one main color distributed in the query image and a specific main color from among the at least one main color by using color information contained in the query image;
    dividing the query image into at least one block having a predetermined number of pixels;
    determining whether each the at least one block divided from the query image includes more than a predetermined percentage of a first main color among the at least one main color, and creating a binary spatial distribution map by digitizing the at least one block;
    receiving a database image for determining a similarity of the database image to the query image;
    dividing the database image into at least one block having a predetermined number of pixels; and
    determining whether each of the at least one block divided from the database image includes more than a predetermined percentage of a second main color among the at least one main color, and creating a binary spatial distribution map for comparison by digitizing the at least one block.

11. The method of claim 10, further comprising determining the similarity of the database image to the query image by comparing the binary spatial distribution map and the binary spatial distribution map for comparison.

12. The method of claim 11, further comprising:
repeatedly switching the first and second main colors to other main colors for all the at least one main color; and
determining the similarity of the database image to the query image by determining a highest similarity from among a plurality of similarities obtained from the repetition.

13. The method of claim 12, further comprising:
creating a translated binary spatial distribution map for comparison by translating the binary spatial distribution map for comparison by a predetermined number of pixels in an up, down, left, or right direction; and
determining the similarity of the database image to the query image by comparing the binary spatial distribution map and the translated binary spatial distribution map for comparison.

14. The method of claim 13, further comprising:
repeating the creation of the translated binary spatial distribution map for comparison for all range of the database image, and
determining the similarity of the database image to the query image by determining a highest similarity from among a plurality of similarities obtained from the repetition.

15. The method of claim 14, wherein the similarity of the database image to the query image is determined according to:

$$S_d^T = \mathrm{argmax}_t \sum_{di,dj} \sum_p H_t(M_{di}^Q(p), M_{dj}^{DB}(p+t))w(d_i, d_j),$$

where $S^T_d$ is the similarity, d is a main color, and T is information about the translation by which to maximize $S^T_d$, t is information about a translation distance, $M^Q_i(p)$ is a binary value of a pth block of the binary spatial distribution map for a specific main color i, $M^{DB}_j(p+t)$ is a binary value of the pth block of the binary spatial distribution map for comparison for a specific main color j that has been translated by t, and $w(d_i,d_j)$ is a weight based on the specific main colors i and j.

16. An image analysis apparatus comprising:
an interface unit for receiving a query image; and
a controller for determining at least one main color distributed in the query image and a specific main color from among the at least one main color by using color information contained in the query image, dividing the query image into at least one block having a predetermined number of pixels, determining whether each of the at least one block divided from the query image includes more than a predetermined percentage of a main color for comparison from among the at least one main color, and creating a binary spatial distribution map by digitizing the at least one block.

17. The image analysis apparatus of claim 16, further comprising a storage for storing a database image for determining similarity of the database image to the query image, and
wherein the controller divides the database image into at least one block having a predetermined number of pixels; determines whether each the at least one block divided from the database image includes more than a predetermined percentage of the specific main color, and creating a binary spatial distribution map for comparison by digitizing the at least one block.

18. The image analysis apparatus of claim 17, wherein the controller determines the similarity of the database image to the query image by comparing the binary spatial distribution map and the binary spatial distribution map for comparison.

19. The image analysis apparatus of claim 18, wherein the similarity is determined according to:

$$S_{Q,DB} = \sum_{i=D} Hit_i(p)$$

$$Hit_i(p) = \begin{cases} 1, & \text{if } M_i^Q = 1 \text{ and } M_i^{DB} = 1 \\ 0, & \text{otherwise,} \end{cases},$$

where $S_{Q,DE}$ is to the similarity, i is to an ith main color, p is to a pth block, D corresponds to all of the main colors, $M^Q_i$ is a binary value of a block of the query image, and $M^{DB}_i$ is a binary value of a block of the database image.

20. The image analysis apparatus of claim 18, wherein the controller determines the database image to be similar to the query image if the similarity is greater than a predetermined value.

21. The image analysis apparatus of claim 17, wherein the controller creates a translated binary spatial distribution map for comparison by translating the binary spatial distribution map for comparison by a predetermined number of pixels in an up, down, left, or right direction.

22. The image analysis apparatus of claim 21, wherein the controller determines the similarity of the database image to the query image by comparing the binary spatial distribution map and the translated binary spatial distribution map for comparison.

23. The image analysis apparatus of claim 22, wherein the controller repeats the creation of the translated binary spatial distribution map for comparison for an entire range of the database image, and determines the similarity of the database image to the query image by determining a highest similarity among a plurality of similarities obtained from the repetition.

24. The image analysis apparatus of claim 23, wherein the controller determines the highest similarity according to:

$$S_d^T = \mathrm{argmax}_t \sum_p H_t(M_d^Q(p), M_d^{DB}(p+t)),$$

where $S^T_d$ is the similarity, d is the specific main color, and T refers to information about the translation by which to have the highest similarity, t is information about a translated distance, $M^Q_d(p)$ is a binary value of a pth block of the binary spatial distribution map for the specific main color d, and $M^{DB}_d(p+t)$ is a binary value of the pth block of the binary spatial distribution map for comparison for the specific main color d, which has been translated by t.

25. An image analysis apparatus comprising:
an interface unit for receiving a query image;
a storage for storing a database image for determining a similarity of the database image to the query image; and
a controller for determining at least one main color distributed in the query image and a specific main color from among the at least one main color by using color information contained in the query image, dividing the query image into at least one block having a predetermined number of pixels, determining whether each of the at least one block divided from the query image includes more than a predetermined percentage of a first main color among the at least one main color; and creating a binary spatial distribution map by digitizing the at least one block, wherein the controller divides the database image into at least one block having a predetermined number of pixels, determines whether each of the at least one block divided from the database image includes more than a predetermined percentage of a second main color among the at least one main color, and creates a binary spatial distribution map for comparison by digitizing the at least one block.

26. The image analysis apparatus of claim 25, wherein the controller determines the similarity of the database image to the query image by comparing the binary spatial distribution map and the binary spatial distribution map for comparison.

27. The image analysis apparatus of claim 26, wherein the controller determines the similarity of the database image to the query image by repeatedly switching the first and second main colors to other main colors for all the at least one main color, and determines a highest similarity among a plurality of similarities obtained by the repetition.

28. The image analysis apparatus of claim 26, wherein the controller determines the similarity of the database image to the query image by creating a translated binary spatial distribution map for comparison by translating the binary spatial distribution map for comparison by a predetermined number of pixels in an up, down, left, or right direction, and compares the binary spatial distribution map with the translated binary spatial distribution map for comparison.

29. The image analysis apparatus of claim 28, wherein the controller repeats the creation of the translated binary spatial distribution map for comparison for an entire range of the database image, and determines the similarity of the database image to the query image by determining a highest similarity among a plurality of similarities obtained from the repetition.

30. The image analysis apparatus of claim 29, wherein the controller determines the highest similarity according to:

$$S_d^T = \arg\max_t \sum_{di,dj} \sum_p H_t(M_{di}^Q(p), M_{dj}^{DB}(p+t))w(d_i, d_j),$$

where $S^T_d$ is the similarity, d is a main color, and T is information about the translation by which to maximize $S^T_d$, t is information about a translation distance, $M^Q_i(p)$ is a binary value of a pth block of the binary spatial distribution map for a specific main color i, $M^{DB}_j(p+t)$ is a binary value of the pth block of the binary spatial distribution map for comparison for a specific main color j that has been translated by t, and $w(d_i, d_j)$ is a weight based on the specific main colors i and j.

* * * * *